United States Patent
Cho

(10) Patent No.: US 6,317,487 B1
(45) Date of Patent: Nov. 13, 2001

(54) METHOD FOR MANAGING MESSAGE BY USING A PERSONAL COMPUTER AS AN OPERATOR CONSOLE IN A PRIVATE BRANCH EXCHANGE SYSTEM

(75) Inventor: Seung-Hwan Cho, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/140,460

(22) Filed: Aug. 26, 1998

(30) Foreign Application Priority Data

Aug. 27, 1997 (KR) .................................................. 97-41519

(51) Int. Cl.$^7$ .............................. H04M 1/64; H04M 3/00; H04M 7/00
(52) U.S. Cl. .................. 379/88.25; 379/67.1; 379/88.22; 379/198; 379/224; 379/232
(58) Field of Search ..................................... 379/9, 20, 34, 379/67.1, 68, 88.22, 88.26, 93.05, 100.09, 157, 201, 203, 214, 218, 217, 223, 260–261, 267, 321, 376, 387, 396, 52, 57, 88.25, 198, 224–226, 232, 234

(56) References Cited

U.S. PATENT DOCUMENTS

| | | | |
|---|---|---|---|
| 3,564,148 | * 2/1971 | Lee ........................................ | 379/207 |
| 3,833,768 | 9/1974 | Scott ..................................... | 379/226 |
| 3,944,751 | 3/1976 | Morgand et al. ..................... | 379/115 |
| 4,166,199 | 8/1979 | Gueldenpfennig ................... | 379/290 |
| 4,438,506 | * 3/1984 | Strom .................................... | 711/154 |
| 4,476,349 | * 10/1984 | Cottrell et al. ....................... | 379/214 |
| 4,529,841 | 7/1985 | Andersson et al. .................. | 379/213 |
| 4,551,832 | 11/1985 | Carll et al. ............................ | 370/360 |
| 4,582,959 | * 4/1986 | Myslinski et al. ................... | 379/88.12 |
| 4,794,639 | 12/1988 | Urui et al. ........................... | 379/88.19 |
| 4,935,954 | * 6/1990 | Thompson et al. ................. | 379/88.04 |
| 5,023,868 | * 6/1991 | Davidson et al. .................... | 370/270 |
| 5,119,415 | 6/1992 | Aoyama ............................... | 379/207 |
| 5,521,964 | * 5/1996 | Schull et al. ........................ | 379/88.12 |
| 5,557,666 | 9/1996 | Kim ...................................... | 379/201 |
| 5,572,577 | 11/1996 | Harrila ................................. | 379/88.22 |
| 5,579,313 | 11/1996 | Ishibashi et al. ..................... | 370/271 |
| 5,712,901 | * 1/1998 | Meermans .......................... | 379/88.14 |
| 5,768,366 | * 6/1998 | Jauregui et al. ..................... | 379/396 |

\* cited by examiner

Primary Examiner—Allan Hoosain
(74) Attorney, Agent, or Firm—Robert E. Bushnell, Esq.

(57) ABSTRACT

A method for managing messages in a private branch exchange system uses a personal computer as an operator console. The method includes storing a message to be transmitted to a subscriber who is absent through the personal computer; if there is a call from the subscriber, transmitting a call message from the subscriber indicating whether the call is for confirming the message or is a general call to the personal computer; if the call message is for confirming the message, automatically displaying the message to be transmitted to the subscriber on a monitor of the personal computer; and informing the subscriber of the displayed message.

12 Claims, 5 Drawing Sheets

METHOD FOR MANAGING MESSAGE BY USING A PERSONAL COMPUTER AS AN OPERATOR CONSOLE IN A PRIVATE BRANCH EXCHANGE SYSTEM

CLAIM FOR PRIORITY

This application makes reference to, incorporates the same herein, and claims all benefits accruing under 35 U.S.C. §119 from an application for METHOD FOR MANAGING MESSAGE THROUGH OPERATOR CONSOLE IN PRIVATE BRANCH EXCHANGE SYSTEM earlier filed in the Korean Industrial Property Office on Aug. 27, 1997, and there duly assigned Ser. No. 41519/1997, a copy of which application is annexed hereto.

BACKGROUND OF THE INVENTION

1. Technical Field

The present invention relates to a method for managing messages through an operator console in a private branch exchange system, and more particularly, to a method for managing messages in a private branch exchange system using a personal computer as an operator console.

2. Related Art

A private branch exchange system is well known, and its operation is commonly described, for example, in U.S. Pat. No. 3,833,768 for PBX Automatic Operator Recall Accessory issued to Scott, U.S. Pat. No. 3,944,751 for Telephone Private Branch Exchange System issued to Morgand et al., U.S. Pat. No. 4,529,841 for Intercept Information Display For A Private Automatic Branch Exchange Telephone System issued to Andersson et al., U.S. Pat. No. 4,551,832 for Telephone Based Control System issued to Carll et al., U.S. Pat. No. 5,557,666 for Method For Displaying An Absent-Message In A Private Exchange System issued to Kim, U.S. Pat. No. 5,572,577 for Information System For A PABX issued to Harrila, and U.S. Pat. No. 5,579,313 for Method Of Multiplexing Speech Signal And Control Signal In ISDN B-Channels For An Exchange System issued to Ishibashi et al.

Typically an operator console (switchboard), such as disclosed in U.S. Pat. No. 4,166,199 for Attendant Console Complex issued to Gueldenpfennig et al., is used for a telephone operator (attendant) to handle an incoming call and serve extension terminals such as to connect an incoming call from a telephone network to an extension terminal of a called subscriber of the private branch exchange system. If the called subscriber is absent, the operator of the private branch exchange system writes down a message left by a calling subscriber and informs the called subscriber of the message if he or she comes back. At a hotel, for example, an incoming call for a specific guest is received by an operator at the front desk, and connected through an operator console to a guest room. If a calling party demands to leave a message for a guest who is absent, the operator of the front desk must write down the message on paper and turn on a lamp or LED (Liquid Emitting Diode) of a telephone (extension terminal) in a guest room so as to inform the absent guest that a message has been left. The guest must then confirm the message by telephoning the operator. However, it is inconvenient for the operator of the private branch exchange system to write down a message on paper.

SUMMARY OF THE INVENTION

Accordingly, it is therefore an object of the present invention to provide a method for managing messages in a private branch exchange system.

It is also an object to provide a method for managing messages by using a personal computer as an operator console in a private branch exchange system.

These and other objects of the present invention can be achieved by a method for managing messages in a private branch exchange system using a personal computer as an operator console includes storing a message to be transmitted to a called subscriber who is absent through the personal computer; when there is a call from the called subscriber, transmitting a call message indicating whether the call is for confirming the message or the call is a general call to the personal computer; when the call message is for confirming the message, automatically displaying the message to be transmitted to the called subscriber on a monitor of the personal computer; and informing the called subscriber of the displayed message.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar element's components, wherein.

DETAILED DESCRIPTION OF THE PREFERRED EMBODIMENT

Figure 1:
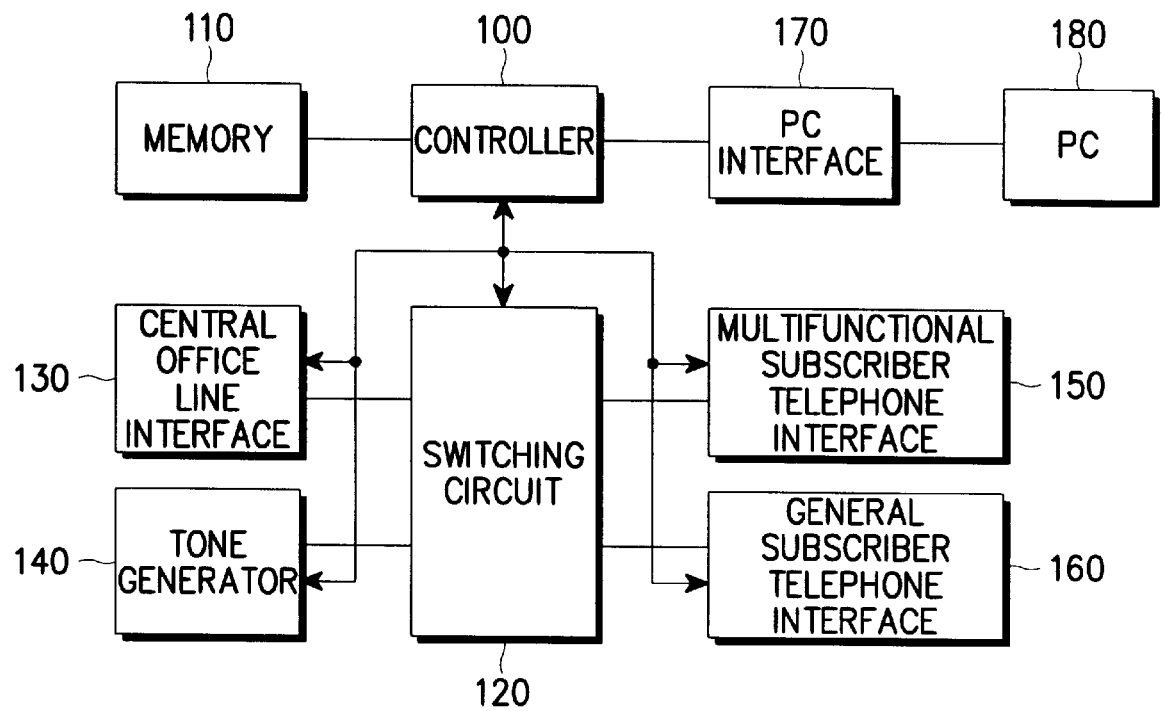
FIG. 1 is a block diagram of a private branch exchange system according to the principles of the present invention.

Referring now to the drawings, FIG. 1 illustrates a private branch exchange system according to the principles of the present invention. As shown in FIG. 1, the private branch exchange system includes a controller 100, a memory 110, a switching circuit 120, a central office line interface 130, a tone generator 140, a multifunctional subscriber telephone interface 150, a general subscriber telephone interface 160, a personal computer (PC) interface 170, and a personal computer (PC) 180 serving as an operator console connected to the PC interface 170.

The controller 100 controls the overall operations of the private branch exchange system. The memory 110 stores programs and data necessary for the operations of the exchange system and stores data generated during the operations of the exchange system. The switching circuit 120 switches a tone signal and voice data between the central office line interface 130, the multifunctional subscriber telephone interface 150 and the general subscriber telephone interface 160 under the control of the controller 100. The central office line interface 130 seizes a central office line under the control of the controller 100 to form a central office line communication loop and interfaces signals between the central office line and the switching circuit 120. The central office line connects the central office line interface 130 to a central office line exchange (not shown). The tone generator 140 generates tone signals under the control of the controller 100 and supplies the tone signals to the switching circuit 120. The multifunctional subscriber telephone interface 150 supplies signaling data to a multifunctional telephone under the control of the controller 100 and supplies signaling data received from the multifunctional telephone to the controller 100. The general subscriber telephone interface 160 supplies communication current to a general telephone under the control of the controller 100 and interfaces signals between the general telephone and the switching circuit 120. The PC interface 170 interfaces with the PC 180 under the control of the controller 100. The PC 180, which is the operator console according to an embodiment of the present invention, stores messages.

Figure 2:
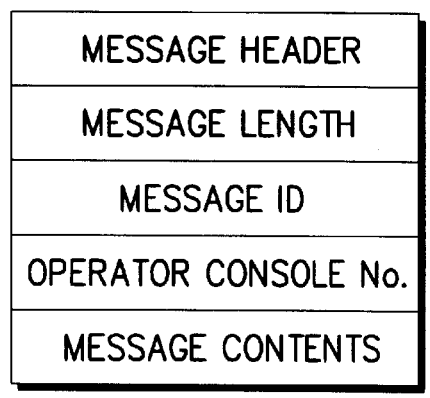
FIG. 2 illustrates a message format according to the principles of the present invention.

Referring to FIG. 2, a message format includes a message header field, a message length field, a message identification (ID) field, an operator console number field, and a message contents field. The message header field designates the beginning of a message. The message length field designates the length of the message including a message header. The message ID field designates the type of the message. The operator console number field designates a unique number assigned to each operator console when there is a plurality of operator consoles; and the message contents field designates appended contents according to a message ID. The message contents field is differently defined according to the message ID.

Figure 4A:
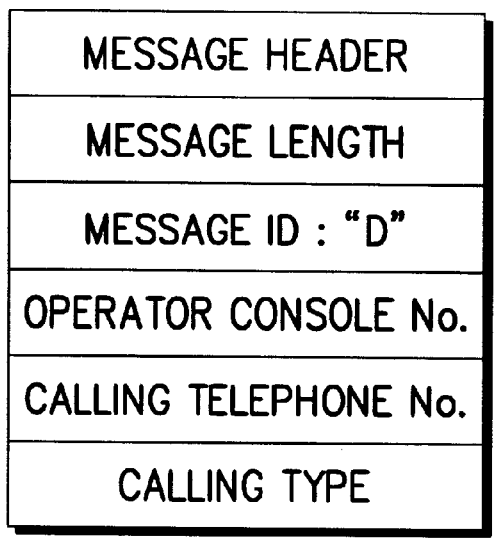
FIGS. 4A to 4C are examples of a format of a message transmitted and received between an extension terminal and an operator console according to the principles of the present invention.
Figure 4B:
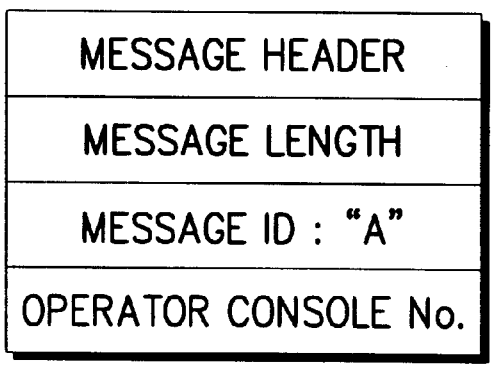
Figure 4C:
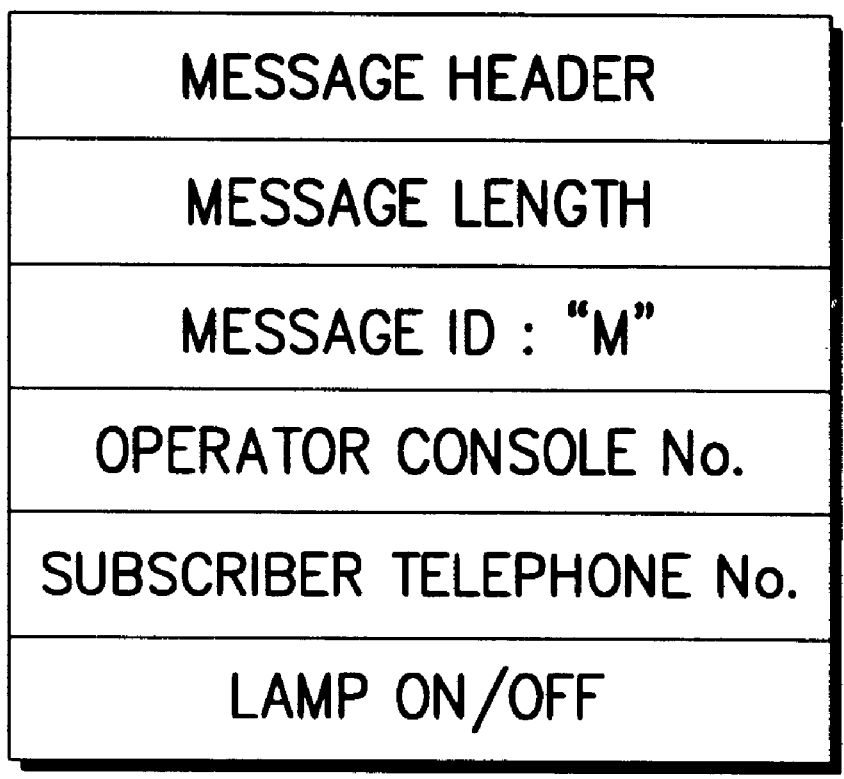

FIGS. 4A, 4B and 4C are examples of a message format transmitted and received between the exchange and the operator console.

FIG. 4A shows a message format for informing the operator console which is the personal computer (PC) that there is an incoming call. The message ID is "D", and a calling telephone number and a calling type are stored in the message contents filed. The calling telephone number is an extension number or a central office line number which has called the operator console. The calling type indicates whether the call is for confirming a message or the call is a general call. For example, the calling type may be set as "0X00" representing a general call and "0X01" designating a call for confirming a message.

FIG. 4B shows a message format for informing the exchange that the operator console has answered an incoming call. The message ID is "A".

FIG. 4C illustrates a message format for turning on or off a lamp of a subscriber terminal. The message ID is "M", and a subscriber telephone number and a lamp ON/OFF status are stored in the message contents filed.

Figure 3:
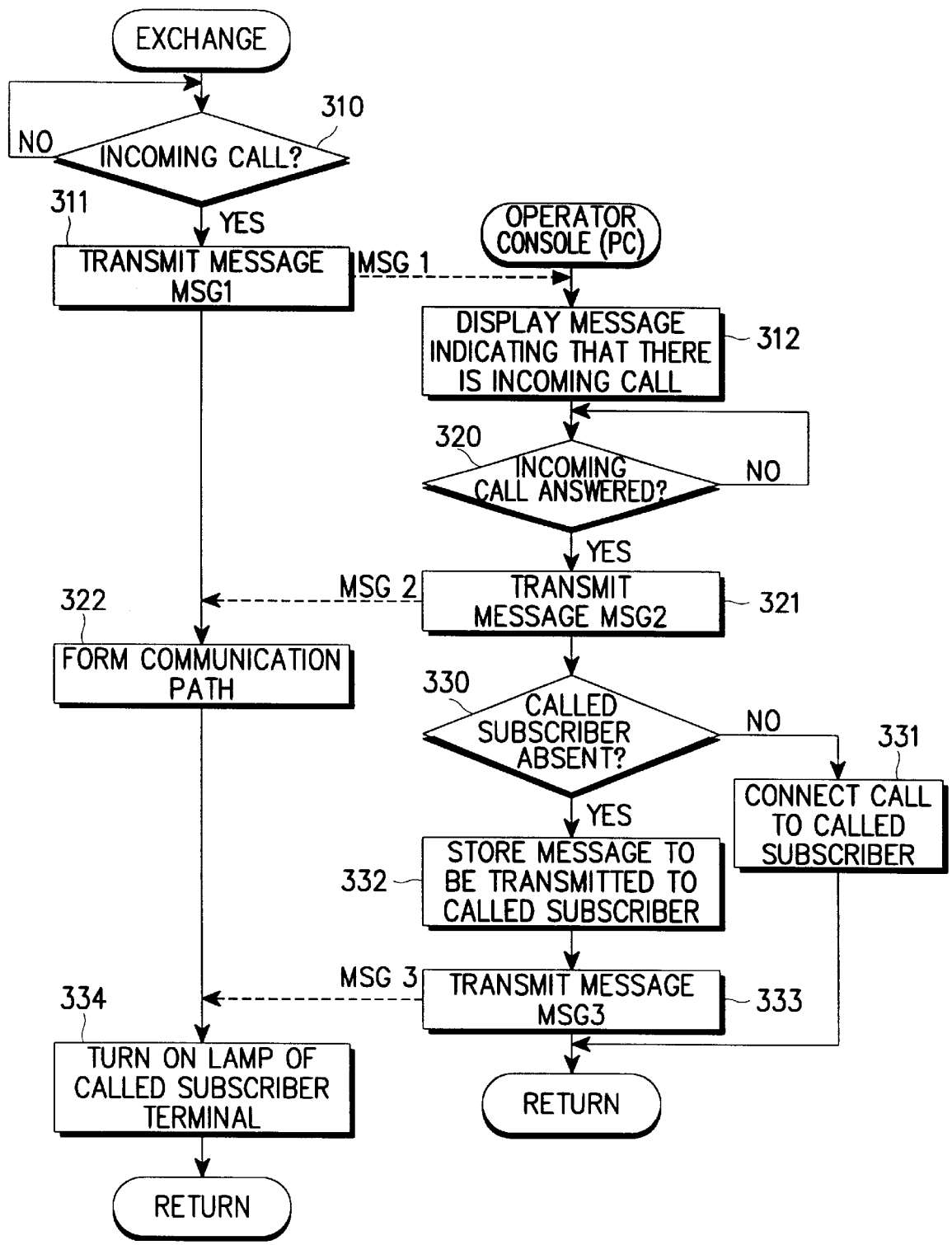
FIG. 3 illustrates a process for storing a message from a calling subscriber during a called subscriber's absence through an operator console in a private branch exchange system according to the principles of the present invention.

Referring to FIG. 3, which illustrates a process for storing a message from a calling subscriber during a called subscriber's absence through the operator console. The controller 100 of the private branch exchange system determines, at step 310, whether there is an incoming call to the operator console through the central office line interface 130 or through the subscriber telephone interface 150 or 160. If there is an incoming call to the operator console, the controller 100, transmits, at step 311, a message MSG1 having the format shown in FIG. 4A through PC interface 170 to the PC 180 serving as the operator console to inform the operator console that there is an incoming call. At step 312, the PC 180 displays on its screen a message indicating that there is an incoming call. At step 320, the PC 180 checks whether the incoming call has been answered. If the incoming call has been answered, the PC 180 transmits, at step 321, a message MSG2 having the format shown in FIG. 4B to the controller 100 through the PC interface 170. The controller 100 receiving the message MSG2 forms, at step 322, a communication path between the operator console and the calling subscriber.

The PC 180 determines, at step 330, whether the called subscriber is absent. If the called subscriber is not absent, the PC 180 connects, at step 331, the call to the called subscriber. If the called subscriber is absent, the PC 180 stores, at step 332, a message to be transmitted to him or her at some later time. The PC 180 then transmits, at step 333, a message MSG3 having the format shown in FIG. 4C to the controller 100 to inform the controller 100 that the message from the calling subscriber has been stored. The controller 100 turns on, at step 334, a lamp or LED of a called subscriber terminal by supplying to that terminal a control signal indicating that the message has been stored.

Figure 5:
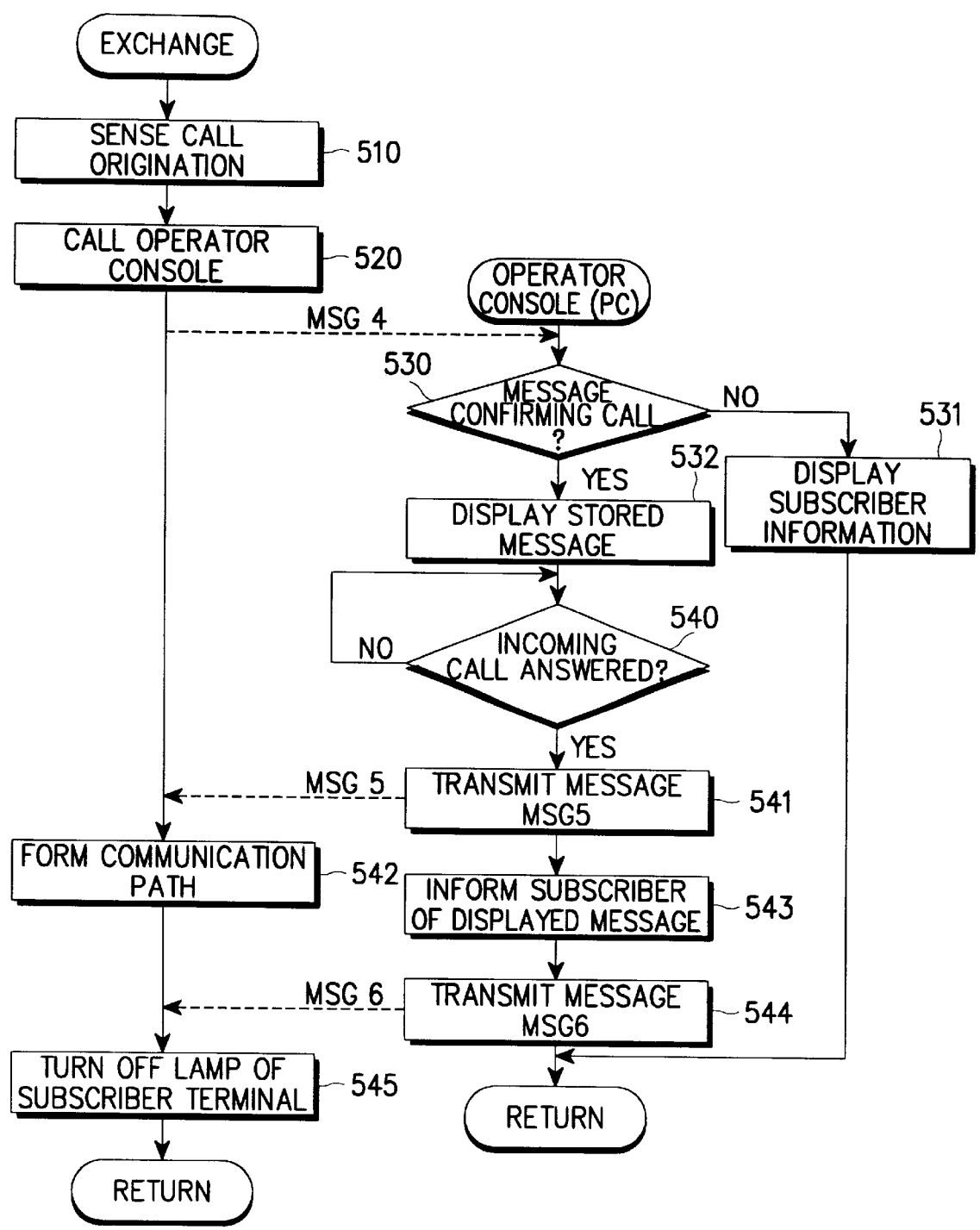
FIG. 5 illustrates a process for confirming a message through an operator console in a private branch exchange system according to the principles of the present invention.

FIG. 5 illustrates a process for confirming a message through the operator console. The controller 100 of the private branch exchange system senses, at step 510, that a call is originated from a subscriber terminal whose lamp has been turned on. At step 520, the controller 100 calls the operator console in which the message for the subscriber terminal is stored and transmits a message MSG4 having the format illustrated in FIG. 4A to the PC 180. The PC 180 determines whether the message MSG4 is a call for confirming the stored message at step 530. The message MSG4 includes information indicating whether a call is for confirming the stored message or the call is a general call. If the call is not for confirming the stored message, the PC 180 generates information about a calling subscriber at step 531. For example, if the calling subscriber is a hotel guest, the PC 180 generates guest information registered during check-in. If the call is for confirming the stored message, the PC 180 displays the stored message on its screen at step 532. At step 540, the PC 180 checks whether the incoming call has been answered. If the incoming call has been answered, the PC 180 transmits, at step 541, a message MSG5 having the format indicated in FIG. 4B to the controller 100 through the PC interface 170. The controller 100 forms, at step 542, a communication path between the calling subscriber and the PC 180. The PC 180 informs the calling subscriber of the displayed message at step 543. The PC 180 transmits, at step 544, a message MSG6 having the format shown in FIG. 4C to the controller 100 through the PC interface circuit 170 to inform the controller 100 that the message has been transmitted to the calling subscriber. The controller 100 turns off, at step 545, the lamp or LED of a calling subscriber terminal.

As described previously, if a calling subscriber leaves a message to a called subscriber who is absent, the operator console stores the message so as to notify the called subscriber. When the exchange informs the operator console that there is an incoming call, a message indicating whether the incoming call is for confirming a message or is a general call is transmitted to the operator console. Therefore, the operator console can easily transmit the message to the subscriber by displaying the message on its screen. At a hotel, for example, if a calling subscriber leaves a message for a guest who is absent through the operator console, the message is not written on paper but stored in a storage device of the operator console, and the lamp of a guest telephone is turned on. Then the guest senses that a message has been left for him or her through the turned-on lamp. If the guest telephones the operator console in order to confirm the message, the operator console displays the stored message and informs the guest of the displayed message.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for managing messages in a private branch exchange system using a personal computer as an operator console, said method comprising the steps of:

storing a message to be transmitted through said personal computer to a called subscriber who is absent;

when there is a call from said called subscriber, transmitting a call message from said called subscriber indicating whether said call is for a purpose of confirming the message to be transmitted or said call is a general call to said personal computer;

when said call message is for the purpose of confirming the message to be transmitted, displaying the message to be transmitted to said called subscriber on a monitor of said personal computer automatically in response to said call message; and informing said called subscriber of the displayed message.

2. The method of claim 1, said call message representing the subscriber's calling intention and including information indicating whether said call is for the purpose of confirming the message to be transmitted to said called subscriber or said call is the general call.

3. A method for managing messages to be transmitted from a caller to a subscriber who is absent through an operator console in a private branch exchange system, said method comprising the steps of:

transmitting a message indicating that there is an incoming call to said operator console in response to the incoming call to said operator console;

displaying said message indicating that there is the incoming call through said operator console;

forming a communication path between said caller and said operator console in response to a message indicating that said operator console has answered the incoming call, and storing a message to be transmitted to said subscriber from said caller;

causing said operator console to transmit a message indicating that the message to be transmitted to said subscriber has been stored;

displaying the stored message in response to a message confirming demand from said subscriber;

informing said subscriber of the displayed message; and when there is a call from said called subscriber, transmitting a call message from said called subscriber indicating whether said call is for a purpose of confirming the message or said call is a general call to said operator console.

4. The method of claim 3, said operator console comprising a personal computer connected to said private branch exchange system.

5. The method of claim 3, further comprising, when said call message is for the purpose of confirming the message, displaying the message to be transmitted to said called subscriber on a monitor of said operator console automatically in response to said call message.

6. A method for managing messages to be transmitted to a subscriber who is absent through an operator console in a private branch exchange system having said operator console which stores messages, a display unit of said operator console for displaying messages, and an exchange for connecting subscribers to said operator console, said method comprising the steps of:

when said subscriber calls said operator console, transmitting a call message representing the subscriber's calling intention to said operator console;

determining whether said call message is for a purpose of confirming the message to be transmitted to said subscriber;

when said call message is for the purpose of confirming the message to be transmitted to said subscriber, displaying the message to be transmitted to said subscriber on said display unit of said operator console; and when said operator console answers a call from said subscriber, transmitting the displayed message to said subscriber;

wherein said call message represents the subscriber's calling intention and includes information indicating whether said call is for the purpose of confirming the message to be transmitted to said subscriber or said call is a general call to said operator console.

7. The method of claim 6, wherein, when said call message is for the purpose of confirming the message to be transmitted to said subscriber, the message to be transmitted to said called subscriber is displayed automatically on the display unit of said operator console in response to said call message.

8. A private branch exchange system, comprising:

a plurality of extension terminals;

an operator console for managing a message to be transmitted from a caller to a subscriber of a designated extension terminal who is absent; and a controller for controlling communications between said operator console and said designated extension terminal, including transmitting an incoming call from the caller to said operator console, forming a communication path between the caller and the subscriber of said designated extension terminal, and turning on a visual indicator of said designated extension terminal requesting the subscriber of said designated extension terminal to confirm said message when the subscriber of said designated extension terminal is absent and said message to be transmitted to the subscriber of said designated extension terminal is stored in said operator console;

wherein, when there is a call from said called subscriber, transmitting a call message from said called subscriber indicating whether said call is for a purpose of confirming the message to be transmitted to the subscriber or said call is a general call to said operator console.

9. The private branch exchange system of claim 8, said operator console managing said message to be transmitted to the subscriber of said designated extension terminal by:

providing a visual display of a message indicating said incoming call;

determining whether said incoming call has been answered by an operator;

after said incoming call has been answered, enabling said controller to form said communication path between the caller and the subscriber of said designated extension terminal;

determining whether the subscriber of said designated extension terminal is absent;

when the subscriber of said designated extension terminal is absent, storing said message to be transmitted to the subscriber of said designated extension terminal; and when the subscriber of said designated extension terminal is absent, enabling said controller to turn on said visual indicator of said designated extension terminal to request the subscriber to confirm said message.

10. The private branch exchange system of claim 9, said operator console comprising a personal computer connected to said controller via an interface.

11. The private branch exchange system of claim 8, said operator console managing said message to be transmitted to the subscriber of said designated extension terminal by:

confirming a call from the subscriber of said designated extension terminal;

providing a visual display of a stored message;

determining whether said incoming call has been answered by an operator;

after said incoming call has been answered, enabling said controller to form said communication path between the caller and the subscriber of said designated extension terminal;

informing the subscriber of said designated extension subscriber of a displayed message; and enabling said controller to turn off said visual indicator of said designated extension terminal to inform the subscriber that there is no message.

12. The system of claim 8, wherein, when said call message is for the purpose of confirming the message to be transmitted to said subscriber, the message to be transmitted to said subscriber is displayed on said operator console automatically in response to said call message.

* * * * *